(12) United States Patent
Ellingson et al.

(10) Patent No.: US 12,217,022 B2
(45) Date of Patent: Feb. 4, 2025

(54) SYSTEMS AND METHODS FOR DIRECT RANDOM INFORMATION GENERATION FROM QUANTUM RANDOM EVENTS

(71) Applicant: Qwerx Inc., Vienna, VA (US)

(72) Inventors: John Ellingson, Haymarket, VA (US); Matthew Richardson, Falls Church, VA (US)

(73) Assignee: Qwerx Inc., Vienna, VA (US)

( * ) Notice: Subject to any disclaimer, the term of this patent is extended or adjusted under 35 U.S.C. 154(b) by 0 days.

(21) Appl. No.: 18/219,918

(22) Filed: Jul. 10, 2023

(65) Prior Publication Data

US 2024/0012619 A1 Jan. 11, 2024

Related U.S. Application Data

(60) Provisional application No. 63/388,152, filed on Jul. 11, 2022.

(51) Int. Cl.
*G06F 7/58* (2006.01)

(52) U.S. Cl.
CPC ................... *G06F 7/588* (2013.01)

(58) Field of Classification Search
CPC .......................................... G06F 7/588
See application file for complete search history.

(56) References Cited

U.S. PATENT DOCUMENTS

| | | | |
|---|---|---|---|
| 4,405,829 A | 9/1983 | Rivest et al. | |
| 4,649,233 A | 3/1987 | Bass et al. | |
| 5,651,064 A | 7/1997 | Newell | |
| 5,729,608 A | 3/1998 | Janson | |
| 5,987,483 A * | 11/1999 | Edelkind | G06F 7/588 708/250 |
| 6,055,637 A | 4/2000 | Hudson et al. | |
| 6,295,541 B1 | 9/2001 | Bodnar et al. | |
| 8,321,670 B2 | 11/2012 | Lior et al. | |
| 8,510,565 B2 | 8/2013 | Tie et al. | |
| 8,817,985 B2 | 8/2014 | Fukuda | |
| 8,855,312 B1 | 10/2014 | Hodgman et al. | |

(Continued)

FOREIGN PATENT DOCUMENTS

| KR | 20180108910 A | 10/2018 |
|---|---|---|
| WO | 2012089967 A1 | 7/2012 |

(Continued)

OTHER PUBLICATIONS

AMYX, Managed PKI Certificates: One step at a time toward security the IoT, Unshackle the Internet of Things, TechBeacon, 14 pages, 2016.

(Continued)

*Primary Examiner* — Michael D. Yaary
(74) *Attorney, Agent, or Firm* — Gesmer Updegrove, LLP

(57) ABSTRACT

A random number generator system is disclosed that includes a quantum event source for generating a quantum event, a quantum event detector for detecting the generated quantum event, a clock circuit providing a looping counting signal including a plurality of counts ($n_0$, n1 etc.), a converter circuit for associating the detected quantum event with a contemporaneous count of the plurality of counts, and a processing system for providing a random number based on the contemporaneous count.

26 Claims, 4 Drawing Sheets

(56) References Cited

U.S. PATENT DOCUMENTS

| | | |
|---|---|---|
| 8,964,947 B1 | 2/2015 | Noolu et al. |
| 9,021,269 B2 | 4/2015 | Spilman |
| 9,178,699 B2 | 11/2015 | Lambert et al. |
| 9,432,198 B2 | 8/2016 | Falk et al. |
| 9,722,803 B1 | 8/2017 | Ellingson et al. |
| 9,813,245 B2 | 11/2017 | Le Saint et al. |
| 9,980,140 B1 | 5/2018 | Spencer et al. |
| 10,015,153 B1 | 7/2018 | Dotan |
| 10,021,100 B2 | 7/2018 | Ellingson et al. |
| 10,057,269 B1 | 8/2018 | Ellingson |
| 10,097,344 B2 | 10/2018 | Davis |
| 10,122,699 B1 | 11/2018 | Ellingson et al. |
| 10,149,156 B1 | 12/2018 | Tiku et al. |
| 10,541,989 B2 | 1/2020 | Ellingson et al. |
| 10,542,002 B2 | 1/2020 | Ellingson et al. |
| 10,771,243 B1 | 9/2020 | Pasquali et al. |
| 11,196,720 B2 | 12/2021 | Thompson et al. |
| 11,670,188 B2 | 6/2023 | Aharonson et al. |
| 2001/0044786 A1 | 11/2001 | Ishibashi |
| 2002/0138761 A1 | 9/2002 | Kanemaki et al. |
| 2003/0084287 A1 | 5/2003 | Wang et al. |
| 2003/0182327 A1 | 9/2003 | Ramanujam et al. |
| 2004/0067736 A1 | 4/2004 | Kamma |
| 2004/0131187 A1 | 7/2004 | Takao |
| 2004/0167804 A1 | 8/2004 | Simpson et al. |
| 2004/0172300 A1 | 9/2004 | Mihai et al. |
| 2004/0172423 A1 | 9/2004 | Kaasten et al. |
| 2005/0187966 A1 | 8/2005 | Lino |
| 2005/0208940 A1 | 9/2005 | Takase et al. |
| 2005/0216769 A1 | 9/2005 | Matsuoka |
| 2006/0010182 A1* | 1/2006 | Altepeter .............. G06F 7/588 708/250 |
| 2006/0010183 A1* | 1/2006 | Rabin .................. H04L 9/0866 708/250 |
| 2006/0053285 A1 | 3/2006 | Kimmel et al. |
| 2006/0075234 A1 | 4/2006 | You et al. |
| 2006/0080545 A1 | 4/2006 | Bagley |
| 2006/0087999 A1 | 4/2006 | Gustave et al. |
| 2006/0133613 A1 | 6/2006 | Ando et al. |
| 2006/0136702 A1 | 6/2006 | Vantalon et al. |
| 2006/0147043 A1 | 7/2006 | Mann et al. |
| 2006/0161775 A1 | 7/2006 | O'Brien et al. |
| 2007/0005985 A1 | 1/2007 | Eldar et al. |
| 2007/0022302 A1 | 1/2007 | Richards, Jr. et al. |
| 2007/0186115 A1 | 8/2007 | Gao et al. |
| 2007/0256118 A1 | 11/2007 | Nomura et al. |
| 2008/0022091 A1 | 1/2008 | Deschpande et al. |
| 2008/0086646 A1 | 4/2008 | Pizano |
| 2008/0209214 A1 | 8/2008 | Schrijen et al. |
| 2008/0235768 A1 | 9/2008 | Walter et al. |
| 2008/0301228 A1 | 12/2008 | Flavin |
| 2008/0313698 A1 | 12/2008 | Zhao et al. |
| 2008/0313723 A1 | 12/2008 | Naono et al. |
| 2009/0006850 A1 | 1/2009 | Birger et al. |
| 2009/0135725 A1 | 5/2009 | Tanaka et al. |
| 2009/0161876 A1 | 6/2009 | Sherkin |
| 2009/0199009 A1 | 8/2009 | Chia et al. |
| 2009/0282467 A1 | 11/2009 | Schenk |
| 2009/0287921 A1 | 11/2009 | Zhu et al. |
| 2010/0042833 A1 | 2/2010 | Platt |
| 2010/0062758 A1 | 3/2010 | Proctor |
| 2010/0104102 A1 | 4/2010 | Brown et al. |
| 2010/0228981 A1 | 9/2010 | Yao |
| 2010/0250952 A1 | 9/2010 | Pang et al. |
| 2010/0279611 A1 | 11/2010 | Kumazawa |
| 2010/0299308 A1 | 11/2010 | Prasad et al. |
| 2011/0010543 A1 | 1/2011 | Schmidt et al. |
| 2011/0138179 A1 | 6/2011 | Jiang et al. |
| 2011/0138719 A1 | 6/2011 | Gosling et al. |
| 2011/0154037 A1 | 6/2011 | Orre et al. |
| 2011/0197064 A1 | 8/2011 | Garcia Morchon |
| 2011/0202755 A1 | 8/2011 | Orsini et al. |
| 2012/0011360 A1 | 1/2012 | Engels et al. |
| 2012/0033803 A1 | 2/2012 | Huang |
| 2012/0093311 A1 | 4/2012 | Nierzwick et al. |
| 2012/0106735 A1 | 5/2012 | Fukuda |
| 2012/0167169 A1 | 6/2012 | Ge |
| 2012/0170751 A1 | 7/2012 | Wurm |
| 2012/0243679 A1 | 9/2012 | Obana |
| 2013/0276092 A1 | 1/2013 | Sun et al. |
| 2013/0035067 A1 | 2/2013 | Zhang et al. |
| 2013/0046972 A1 | 2/2013 | Campagna et al. |
| 2013/0097117 A1 | 4/2013 | Lasky et al. |
| 2013/0152160 A1 | 6/2013 | Smith et al. |
| 2013/0182848 A1 | 7/2013 | Sundaram et al. |
| 2013/0232551 A1 | 9/2013 | Du et al. |
| 2013/0243194 A1 | 9/2013 | Hawkes et al. |
| 2014/0013108 A1 | 1/2014 | Pellikka et al. |
| 2014/0057601 A1 | 2/2014 | Michau et al. |
| 2014/0162601 A1 | 6/2014 | Kim et al. |
| 2014/0164768 A1 | 6/2014 | Kruglick |
| 2014/0164776 A1 | 6/2014 | Hook et al. |
| 2015/0013015 A1 | 1/2015 | Zheng et al. |
| 2015/0039651 A1 | 2/2015 | Kinsely et al. |
| 2015/0058841 A1 | 2/2015 | Krempa et al. |
| 2015/0101037 A1 | 4/2015 | Yang et al. |
| 2015/0106898 A1 | 4/2015 | Du et al. |
| 2015/0220726 A1 | 8/2015 | Huo |
| 2015/0222632 A1 | 8/2015 | Ichijo et al. |
| 2015/0237026 A1 | 8/2015 | Kumar |
| 2015/0281199 A1 | 10/2015 | Sharma |
| 2015/0286719 A1 | 10/2015 | Sampathkumaran |
| 2015/0372811 A1 | 12/2015 | Le Saint et al. |
| 2016/0063466 A1 | 3/2016 | Sheridan et al. |
| 2016/0065370 A1 | 3/2016 | Le Saint et al. |
| 2016/0099901 A1 | 4/2016 | Allen et al. |
| 2016/0099922 A1 | 4/2016 | Dover |
| 2016/0156614 A1 | 6/2016 | Jain et al. |
| 2016/0182497 A1 | 6/2016 | Smith |
| 2016/0197706 A1 | 7/2016 | Lester et al. |
| 2016/0260169 A1 | 9/2016 | Arnold et al. |
| 2016/0261690 A1 | 9/2016 | Ford |
| 2016/0308858 A1 | 10/2016 | Nordstrom et al. |
| 2016/0337326 A1 | 11/2016 | O'Hare et al. |
| 2016/0342394 A1 | 11/2016 | Tsirkin |
| 2017/0034167 A1 | 2/2017 | Figueira |
| 2017/0201380 A1 | 7/2017 | Schaap et al. |
| 2017/0243212 A1 | 8/2017 | Castinado et al. |
| 2017/0324548 A1 | 11/2017 | Anshel et al. |
| 2018/0052662 A1 | 2/2018 | Dale et al. |
| 2018/0077156 A1 | 3/2018 | Ellingson et al. |
| 2018/0131526 A1 | 5/2018 | Ellingson et al. |
| 2018/0343259 A1 | 11/2018 | Ellingson |
| 2018/0367533 A1 | 12/2018 | Ellingson et al. |
| 2019/0036899 A1 | 1/2019 | Ellingson et al. |
| 2019/0149552 A1 | 5/2019 | Ellingson |
| 2020/0067927 A1 | 2/2020 | Ellingson et al. |
| 2020/0111091 A1 | 4/2020 | Ellingson |
| 2020/0235914 A1 | 7/2020 | Zhang et al. |
| 2020/0287716 A1 | 9/2020 | Zitlaw et al. |
| 2020/0301670 A1* | 9/2020 | Thornton .............. G06F 7/588 |
| 2020/0322148 A1 | 10/2020 | McGough |
| 2021/0211271 A1 | 7/2021 | Kuang et al. |
| 2021/0373854 A1 | 12/2021 | Hill |
| 2022/0126210 A1 | 4/2022 | Kumar et al. |
| 2022/0158826 A1 | 5/2022 | Gordon et al. |
| 2022/0271927 A1 | 8/2022 | Stayskal |
| 2022/0391174 A1* | 12/2022 | Kleijn .............. G02B 6/4298 |
| 2023/0023529 A1 | 1/2023 | Jenkins et al. |
| 2023/0048912 A1 | 2/2023 | Gasti et al. |
| 2023/0155825 A1 | 5/2023 | Wu |
| 2023/0179411 A1 | 6/2023 | Van Loon |
| 2023/0180017 A1 | 6/2023 | Gadalin et al. |
| 2024/0235815 A1 | 7/2024 | Pecen et al. |

FOREIGN PATENT DOCUMENTS

| | | |
|---|---|---|
| WO | 2018049116 A1 | 3/2018 |
| WO | 2018194801 A1 | 10/2018 |
| WO | 2018222281 A1 | 12/2018 |
| WO | 2019126823 A1 | 6/2019 |
| WO | 2019200215 A1 | 10/2019 |

(56) References Cited

FOREIGN PATENT DOCUMENTS

| WO | 2020092886 A1 | 5/2020 |
|---|---|---|
| WO | 2024151476 A1 | 7/2024 |

OTHER PUBLICATIONS

Bocek, Venafi Blog, Attack on Trust Threat Bulletin: Sony Breach Leaks Private Keys, Leaving Door Open, Dec. 4, 2014, retrieved from https://www.venafi.com/blog/attack-on-trust-threat-bulletin-sony-breach, 7 pages.

Cheng Haosu et al., OSCO: An Open Security-Enhanced Compatible OpenFlow Platform, Jun. 13, 2018, SAT 2015 18th International Conference, Austin, TX, USA, Sep. 24-27, 2015: [Lecture Notes in Computer Science; Lect. Notes Computer], Springer, Berlin, Heidelberg, pp. 66-77, XP047475241, ISBN: 978-3-540-74549-5, retrieved on Jun. 13, 208, Sections 1-4, Figures 1-5.

Chiba et al., Dynamic Authorization Extensions to Remote Authentication Dial in User Service (RADIUS), Network Working Group, Microsoft Corporation, RFC 5176, Jan. 2008, 35 pages.

Cisco, Dynamic Shared Secret for the Cisco CMTS Routers, Feb. 14, 2008, Cisco IOS CMTS Software Configuration Guide, 32 pages.

Cnodder et al., RADIUS Dynamic Authorization Server MIB, Network Working Group, Cisco Systems, Inc., RFC 4673, Sep. 2006, 25 pages.

Commission on Enhancing National Cybersecurity, Report on Securing and Growing the Digital Economy, 100 pages, Dec. 1, 2016.

Communication Relating to the Results of the Partial International Search issued by the International Searching Authority (the European Patent Office) in related international application No. PCT/US2024/010399 on Apr. 26, 2024, 2 pages.

Cremers et al., A Family of Multi-Party Authentication Protocols, 12 pages.

DBIR, 2016 Data Breach Investigations Report—89% of breaches had a financial or espionage motive, Verizon 2016 Data Breach Investigations Report, pp. 1-85, 2016.

Dierks et al., The Transport Layer Security (TLS) Protocol Version 1.1, Network Working Group, https://tools.ietf.org/html/rfc4346?cm_mc_uid=55413578387314706858380&cm_mc_sid_50200000=1472153170, pp. 1-174, Apr. 2006.

Dr. Dobbs, The Book Cipher Algorithm, retrieved from http://www.drdobbs.com/security/the-book-cipher-algorithm/210603676 on Sep. 24, 2008, 5 pages.

Final Office Action issued by the United States Patent and Trademark Office in related U.S. Appl. No. 18/110,180 on Jan. 17, 2024, 38 pages.

Glover, PC1 3.1: Stop Using SSL and Outdate TLS Immediately, http://blog.securitymetrics.com/2015/04/pci-3-1-ssl-and-tls.html, pp. 1-6, Aug. 25, 2016.

Grass et al., Draft NIST Special Publication 800-63B Digital Authentication Guideline, Authentication and Lifecycle Management, National Institute of Standards and Technology, U.S. Department of Commerce, pp. 1-48, Nov. 18, 2016.

Hosseinkhani et al., Using image as cipher key in AES, IJCSI International Journal of Computer Science Issues, vol. 9, Issue 2, No. 2, ISSN (Online): 1694-0814, pp. 538-544, Mar. 2012.

IBM Knowledge Center, RSCS Dynamic Authorization Server Virtual Machine, Version 6.3.0, 2 pages.

IBM, The Secure Sockets Layer and Transport Layer Security, Verification of X.509 Public Key Certificates for Secure Communications, http://www.ibm.com/developerworks/library/ws-ssi-security, pp. 1-48, Jun. 6, 2012.

International Preliminary Report on Patentability issued by the International Bureau of WIPO in related International Application No. PCT/US2017/050614 on Mar. 12, 2019, 9 pages.

International Preliminary Report on Patentability issued by the International Bureau of WIPO in related International Application No. PCT/US2018/027316 on Dec. 3, 2019, 9 pages.

International Preliminary Report on Patentability issued by the International Bureau of WIPO in related International Application No. PCT/US2018/024521 dated Oct. 22, 2019, 7 pages.

International Preliminary Report on Patentability issued by the International Bureau of WIPO in related International Application No. PCT/US2018/067444 dated Jun. 30, 2020, 6 pages.

International Preliminary Report on Patentability issued by the International Bureau of WIPO in related International Application No. PCT/US2019/059369 dated Apr. 27, 2021, 5 pages.

International Preliminary Report on Patentability issued by the International Bureau of WIPO in related International Application No. PCT/US2019/027161 dated Oct. 13, 2020, 5 pages.

International Search Report and Written Opinion issued by the International Searching Authority, the Korean Intellectual Property Office, in related International Application No. PCT/US2019/059369 dated Feb. 24, 2020, 9 pages.

International Search Report and Written Opinion issued by the International Searching Authority, the Korean Intellectual Property Office, in related International Application No. PCT/US2019/027161 dated Aug. 13, 2019, 8 pages.

International Search Report and Written Opinion issued by the International Searching Authority (the European Patent Office) in related international application No. PCT/US2024/010399 on Jun. 17, 2024, 14 pages.

International Search Report and Written Opinion issued by the Korean Intellectual Property Office, as the International Searching Authority, in related International Application No. PCT/US2018/024521 dated Jul. 12, 2018, 9 pages.

International Search Report and Written Opinion issued by the Korean Intellectual Property Office, as the International Searching Authority, in related International Application No. PCT/US2018/067444 dated Apr. 5, 2019, 9 pages.

International Search Report and Written Opinion of the International Searching Authority, the Korean Intellectual Property Office, issued in related International Application No. PCT/US2017/050614 on Nov. 16, 2017, 11 pages.

International Search Report and Written Opinion of the International Searching Authority, the Korean Intellectual Property Office, issued in related International Application No. PCT/US2018/043634 on Oct. 26, 2018, 11 pages.

International Search Report and Written Opinion of the International Searching Authority, the Korean Intellectual Property Office, issued in related International Application No. PCT/US2018/027316 on Aug. 30, 2018, 11 pages.

Jarmoc, Transitive Trust and SSL/TLS Interception Proxies, SecureWorks, https://www.secureworks.com/research/transitive-trust, pp. 1-21, Mar. 21, 2012.

Juniper Networks, Inc., Enabling IMS AAA Dynamic Authorization, 1999-2010, 5 pages.

Kin-Wah, et al., On the Feasibility and Efficacy of Protection Routin in IP Networks, University of Pennsylvania Scholarly Commons, Departmental Papers, Department of Electrical & Systems Engineering, Proceedings of the IEEE 2010 Conference on Computer Communications (INFOCOM 2010), San Diego, CA, Mar. 2010, Dec. 10, 2009, 11 pages.

Levi et al., An efficient, dynamic and trust preserving public key infrastructure, IEEE.org, IEEE Xplore Digital Library, Aug. 6, 2002, 3 pages.

Lim et al., A Dynamic Key Infrastructure for GRID, Information Security Group, 10 pages.

Meyburgh, Dynamic Distributed Key Infrastructure DDKI, Tunnel Project with GateKeeper and KeyVault, A00214314, (Comp 8045 & Comp 8046), 47 pages.

Moreau, Why Should We Look for Alternatives to the Public Key Infrastructure (PKI) Model?, Connotech Experts-conseils Inc., Aug. 1999, Quebec, Canada, 4 pages.

Non-Final Office Action issued by the United States Patent and Trademark Office in related U.S. Appl. No. 18/110,180 on Jun. 13, 2023, 34 pages.

Non-Final Office Action issued by the United States Patent and Trademark Office in related U.S. Appl. No. 18/110,180 on Jun. 3, 2024, 37 pages.

Palo Alto Networks, Government Endpoint, Use Case, 6 pages.

(56) References Cited

OTHER PUBLICATIONS

Pansa et al., Web Security Improving by Using Dynamic Password Authentication, 2011 International Conference on Network and Electronics Engineering, pp. 32-36, 2011.

Piotr K Tysowski et al., The Engineering of a Scalable Multi-Site Communications System Utilizing Quantum Key Distribution (QKD), arxiv.org, Cornell University Library, 201 Olin Library Cornell University Ithaca, NY 14853, Dec. 7, 2017, XP080845597, DOI: 10.1088/2058-9565/AA9A5D.

RSA, Global Security Chiefs Offer Five Recommendations to Overhaul Outdated Information Security Processes, http://www.rsa.com/en_us/company/newsroom/global-security-chiefs-offer-five-recommendations-to-overhaul, pp. 1-11, Dec. 10, 2013.

RSA, Two-Factor Authentication is a Must for Mobile, https://blogs.rsa.com/two-factor-authentication-is-a-must-for-mobile, www.rsa.com, pp. 1-7, Aug. 24, 2016.

Salem et al., The Case for Dynamic Distribution for PKI-based Vanets, International Journal of Computer Networks & Communications (IJCNC), vol. 6, No. 1, pp. 61-78, Jan. 2014.

Sharma Purva et al., Quantum Key Distribution Secured optical Networks: A Survey, IEEE Open Journal of the Communications Society, IEEE, vol. 2, Aug. 23, 2021, pp. 2049-2083, XP011877197, DOI: 10.1109/OJCOMS.2021.3106659, retrieved on Mar. 9, 2021, sections III, IV, V, figures 12-15, 17, 18.

Stack Exchange, What can an attacker do with a stolen SSL private key? What should the web admin do?Retrieved from http://security.stackexchange.com/questions/16685/what-can-an-attacker.

Wang et al., ID-Based Authenticated Multi-Party Key Agreement Protocol to Multimedia Applications Systems, 2008 International Conference on Computer Science and Software Engineering, 2008 IEEE, 4 pages.

Whitenoise, Unclassified story of Whitenoise Super Key Encryption and Dynamic Identity Verification and Authentication, 9 pages.

Wikipedia, Dynamic SSL, https://en.wikipedia.org/wiki/Dynamic_SSL_Dynamic SSL-Wikipedia, the free encyclopedia, pp. 1-4, Aug. 25, 2016.

Wikipedia, Man-in-the-middle attack, https://en.wikipedia.org/w/index.php?title-Man-in-the-middle_attach&oldid=753645501, 5 pages, Dec. 8, 2016.

Wnlabs, One time pad security, retrieved from http://wnlabs.com/solution.html on Jun. 13, 2017, 2 pages.

* cited by examiner

SYSTEMS AND METHODS FOR DIRECT RANDOM INFORMATION GENERATION FROM QUANTUM RANDOM EVENTS

PRIORITY

The present application claims priority to U.S. Provisional Patent Application No. 63/388,152 filed Jul. 11, 2022, the disclosure of which is hereby incorporated by reference in its entirety.

BACKGROUND

The present invention relates generally to random number generators, and, more specifically, to random number generators that produce random numbers based on random events.

Random numbers are an important resource used throughout computer science. In computation, randomized algorithms allow for solutions for a variety of fundamental problems for which no deterministic algorithms are available. This includes Monte Carlo methods that have widespread applications in science for the simulation of physical, chemical and biological systems, or broad range of applications in finance for options trading or stochastic modeling.

Random numbers are fundamental in cryptography and cybersecurity. They are the foundation of schemes to create encryption keys for secure communication. Prior to the recent patents cited in this application it was essential that the random numbers employed were kept secret from any adversarial third party.

Many applications of computer systems require access to a stream of random numbers. Typical applications include cryptography, gaming, and statistical sampling and analysis. Random number generators (RNG) have been based on various physical effects such as the thermal noise of electronic components, radioactive decay, and shot noise. Other RNGs are based on software approaches and can use timing of a computer user's movements as a basis for random number generation. Well-designed RNGs are generally able to provide long sequences of random numbers, but eventually the numbers produced are not completely statistically unrelated and are more properly considered to be "pseudorandom."

Just as a physical coin being flipped might be biased or its movement could be foreseeable by a computationally powerful attacker, hardware random number generators (HRNGs) are only as random as their underlying physical sources are unpredictable. The manufacturers of HRNGs have to be trusted on the inner workings of their devices. Even though one can run statistical tests on the output of HRNGs, it is in principle impossible to verify that the created bits are indeed random. For example, an HRNG in Internet of Things (IoT) devices can fail to produce proper randomness when too many random numbers are needed too quickly.

Pseudo random number generators (PRNGs) are only conditionally computationally secure and hence do not provide everlasting security against future technological advances. Moreover, certifications such as from NIST are susceptible to potential backdoors, as showcased by this critical example.

Virtualized PRNG might inadvertently reuse the same source in multiple instances, leading to different machines creating the same "random numbers".

These potential vulnerabilities of classical technologies for generating randomness can be addressed with quantum technologies that make use of the inherent unpredictability of the physics of microscopically small systems. A number of sources of quantum randomness have been proposed and utilized to generate randomness (e.g., from random energy states) that can then be converted to a number and applied to various applications. The conversion however, of quantum randomness to numerical randomness has proven to be challenging. Various methodologies have been utilized that include such efforts as capturing the energy state of the quantum event and quantifying that value and utilizing it as a seed value in a pseudo random number generating (PRNG) algorithm.

There remains a need therefore, for a random number generator that efficiently and economically truly produces random numbers of any size and base.

SUMMARY

In accordance with an aspect, the invention provides a random number generator system that includes a quantum event source for generating a quantum event, a quantum event detector for detecting the generated quantum event, a clock circuit providing a looping counting signal including a plurality of counts ($n_0$, n1 etc.), a converter circuit for associating the detected quantum event with a contemporaneous count of the plurality of counts, and a processing system for providing a random number based on the contemporaneous count.

In accordance with another aspect, the invention provides a method of generating a random number. The method includes generating a quantum event, detecting the generated quantum event, providing a looping counting signal including a plurality of counts ($n_0$, n1 etc.), associating the detected quantum event with a contemporaneous count of the plurality of counts, and providing a random number based on the contemporaneous count.

In accordance with another aspect, the invention provides a random number generator system that includes a quantum event detector for detecting a quantum event, a processing system including a clock circuit providing a counting signal including a plurality of counts, a converter circuit for associating the detected quantum event with a contemporaneous count of the plurality of counts, and providing a random number responsive to the detected quantum event as associated with the contemporaneous count of the plurality of counts, and a subsequent application processing system for receiving the random number with no attendant means to deconstruct the generation of the random number.

In accordance with a further aspect, the invention provides a secured computer processing system comprising a security key that is generated based at least in part by a detected quantum event from a quantum event detector that detects a quantum event. The security key may be further generated responsive to a looping control signal in combination with the detected quantum event.

BRIEF DESCRIPTION OF THE DRAWINGS

The following description may be further understood with reference to the accompanying drawings in which.

The drawings are shown for illustrative purposes only.

DETAILED DESCRIPTION

The present disclosure is directed at quantum random number generators (QRNG) in which the quantum randomness of timing of quantum events is used to generate the random numbers. Systems of certain aspects of the invention generate a random number directly from the observation and recording of the occurrence/timing of a quantum random event. The system uses events that occur randomly in time at the quantum level to directly generate random numbers by sequentially converting the random timing of the events to numbers.

Figure 1:
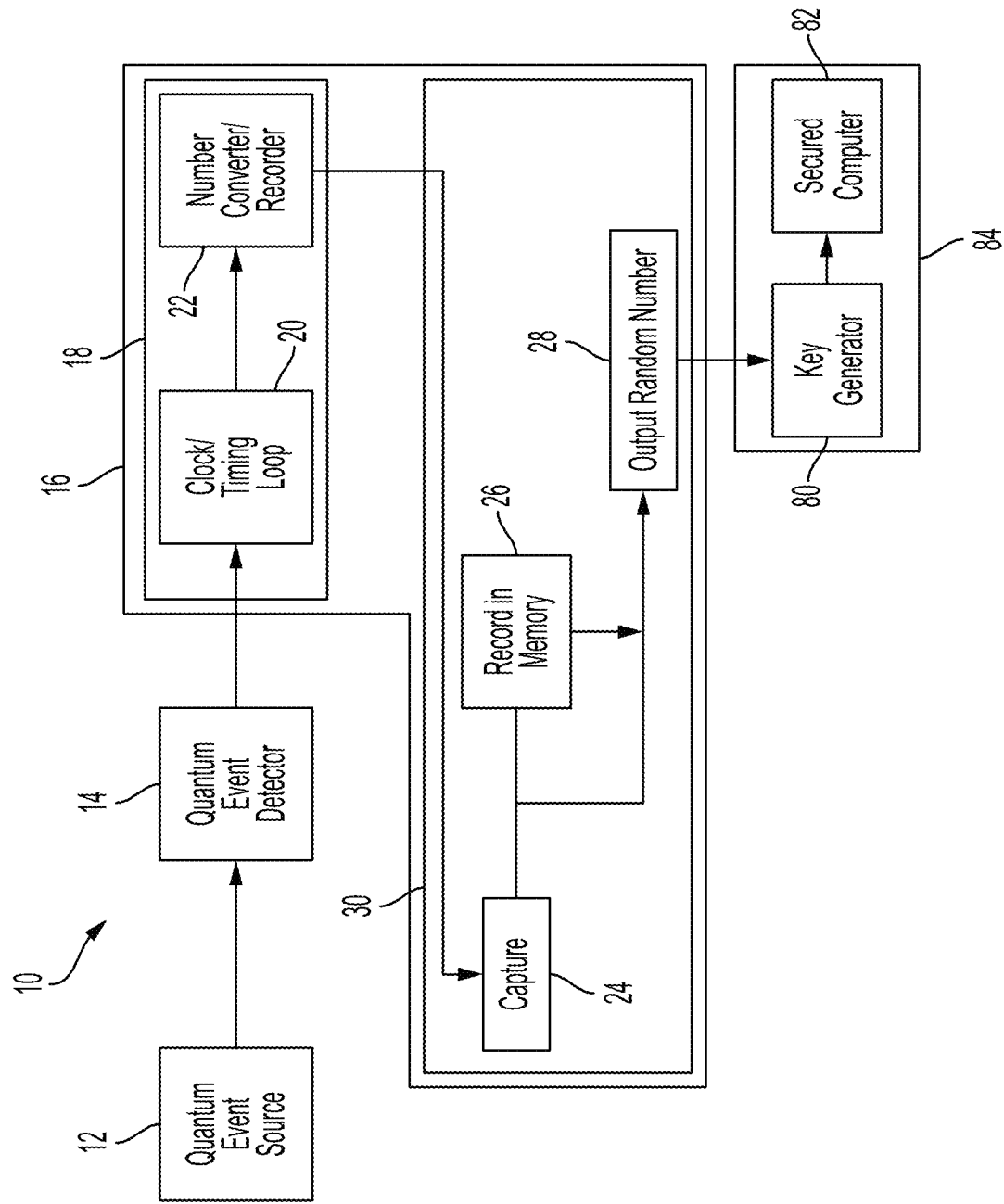
FIG. 1 shows an illustrative diagrammatic view of a random number generator system in accordance with an aspect of the present invention.

With reference to FIG. 1, a system 10 in accordance with an aspect of the present invention includes a quantum event generator source 12 that is a source of a random or probabilistic quantum event. Examples events might be radioactive decay, a quantum electrodynamic event, etc. For example, Radium emits 36,000 alpha particles/sec./microgram. Thorium emits 4500 alpha particles/sec./gram. An event detector 14 detects the random quantum event. Examples of such as detector may include a scintillator or a single photon counting module. The output of the quantum event detector is provided to a computer processing system 16 that includes a timing system 18 that include a clock/timer loop 20 and a number converter/recorder 22. As soon as an event is detected, the clock/timer loop 20 latches to a contemporaneous count in the continuous loop. An example may be a picosecond clock, which counts time in trillionths of a second. The loop, for example, may count 0-9 to yield a base 10 number. The number converter/recorder 22, which may be a software program running on the computer processor, outputs the count number 0-9. The ten numerals (e.g., $n_0$, $n_1$, $n_2$, $n_3$, $n_4$, $n_5$, $n_6$, $n_7$, $n_8$, $n_9$) in the base-10 system would repeat indefinitely and continuously. This number is captured at a capture input port 24, optionally stored in a memory 26 and provided as an output random number at 28 (including any number of digits) of a number sub-processing routine 30. For multiple digit numbers, the system will store each generated digit until all digits are available and the result may be provided as the multi-digit output random number at output 28 of the number sub-processing routine 30. Each digit of the output random number may be obtained from each output of a count number (e.g., 0-9).

The output may be streamed, and the memory may include any of RAM, ROM or any non-transitory stable digital media. In accordance with various further aspects, the output may further provide unparsed random numbers or other information representations for a variety of applications. In fact, the output random number may not even be a number per se but rather may be a string of bits or other units of variable information. The output random number 28 may for example be used by a subsequent computer processing system 84 including a key generator 80 and a secured computer 82. The key generator 80 may be used to generate a secure key for the secured computer 82. Because the output random number was not developed based on any predictable or discoverable algorithm, the key cannot be determined. Such an improved secured computer processing system has myriad applications for example in finance, government and the military.

The random event generator 12 releases a particle/photon, etc. The detector 14 detects the event, and the timer 20 is noted at the precise time of detection of the event. The precise time is recorded as a number 22. The output of the recording is streamed to the processor 30 and recorded in memory 26. The process is repeated creating a sequence of numbers directly corresponding (1:1) with the random events.

The sequence of numbers recorded from the events may be in any base number system and the numbers are unparsed at the time of recording. The sequence is further processed and only the last digit of the recorded time is retained. This produces a sequence of random numbers with a 1:1 equivalency to the entropy of the timing of the events recorded. For example, in the base ten, the numbers from which the sequence would be available would be 0, 1, 2, 3, 4, 5, 6, 7, 8, 9. The clock must measure time one order magnitude faster than the high mean frequency of the event being measured. This ensures the selection would be truly random. For example, if the system is operating in base ten and the events have a high mean frequency of one event every millionth of a second, the clock must measure in a billionth of a second. Faster clocks are permissible but offer no benefit. In accordance with various aspects, the generated number may be a base n number where n is not ten, such as base two, eight or sixteen etc.

The event generator could be attenuated to reduce the frequency of particles/photons reaching the sensors. Further, from an engineering perspective, sensors require some recovery time after detection (reset) before being available to detect the next event. This probably has no effect on the system. While it would rule out the detection of random events occurring nearly simultaneously, over time missing one or more random events should have no impact on the total entropy or randomness of the aggregate collection of random events.

The variance of the random event (radioactive decay, for example) only has to occur within the window of the time available from the average frequency of the event and the window of opportunity of time offered by the clock—or one order of magnitude. For example, if the event occurs within a millionth of a second, the clock must measure to a frequency of a ten millionth of a second or greater for base ten numeral generation. For further applications, the sequence of random numbers may be parsed by the user in any manner selected by the user. The user may wish to parse the sequence, for example, to fit a particular bit structure for encryption key length or lottery numbers, etc.

In accordance with various aspects of the present invention, the method is agnostic as to the quantum phenomenon utilized. Instead of capturing a variable, such as an energy state, the present invention utilizes the quantum randomness of the timing of the event to generate a random number in a novel manner. For example, in one possible application, a source of radioactive decay such as Americium or Thorium might be utilized as a source of randomly emitted alpha particles.

The quantum event generator source 12 may be a source of entropy, which is a quantum process that is inherently random and probabilistic, making it an ideal choice for generating unpredictable random numbers. The source 12 may, for example, be a quantum entropy chip (QEC) that has radioactive decay as its source of randomness. Radioactive decay (also known as nuclear decay, radioactivity, radioactive disintegration or nuclear disintegration) is the process by which an unstable atomic nucleus loses energy by spontaneous emission (without any excitation from outside) of particles and radiation to form a stable product. A material containing unstable nuclei is considered radioactive. QEC exploits the emitted alpha particles resulting from the decay of a radioactive isotope.

Figure 2:
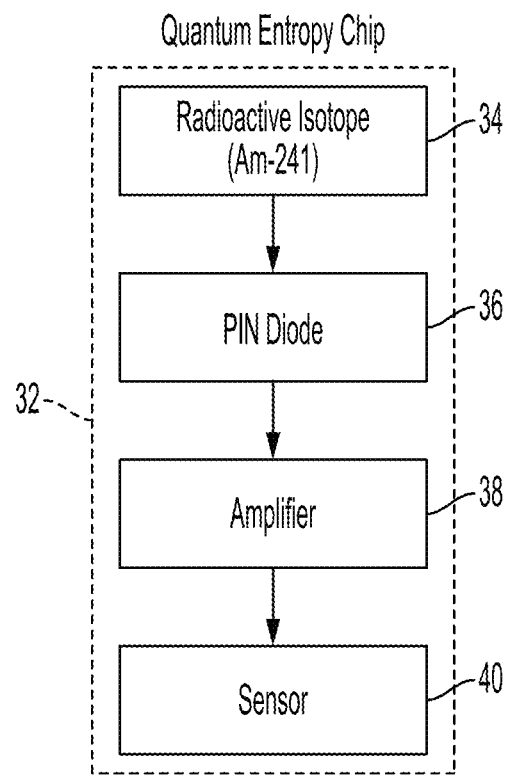
FIG. 2 shows an illustrative diagrammatic view of a functional component diagram of a quantum entropy integrated circuit for use in accordance with an aspect of the present invention.

FIG. 2 shows a functional component diagram of a quantum entropy chip 32 (e.g., a non-deterministic random bit generator (NRBG)), including a radioactive isotope 34, a PIN diode 36, an amplifier 38 and a sensor 40. The alpha particle is actually the nucleus of a helium-4 atom, $_2{}^4$He, and consists of two protons and two neutrons, i.e., with two positive charges. Alpha decay occurs when a heavy unstable (because of the excess of nucleons) atomic nuclei dissipate excess energy by spontaneously ejecting an alpha particle. The system may be used as a quantum source (12 in FIG. 1) and the sensor 40 may provide the quantum event detector (14 in FIG. 1) to the computer processing system 16 of FIG. 1.

QEC consists of a radioactive isotope (Am-241) that emits alpha particles as a result of its decay, CMOS-type photo diode (for the detection of emitted alpha particles), two trans-impedance amplifiers (TIAs) (to amplify and detect low levels of the light current by the absorption of an alpha particle) and a comparator (to transform the amplified voltage from TIAs to an analog pulse signal, called a quantum random pulse). The energy level of the alpha particle emitted by the Americium-241 used in the QEC is 4 MeV and its radioactivity level is 4.07 kobo. The chip has a size of 3 mm×3 mm×0.85 mm with a power consumption of 3 mW. It generates random analog pulse when an alpha particle from the radioactive decay is detected which is then digitized and fed into time-to-digital converter. The output is processed by the randomness extraction module to generate raw random bits. The alpha decay of Americium-241 can be expressed as:

$$_{95}^{241}\text{Am} \rightarrow {}^{237}\text{Np} + {}^4\text{He} \quad (1)$$

where, the numbers in subscript and superscript in the above reaction represent the atomic number and the mass number of the nucleus, respectively.

Figure 3:
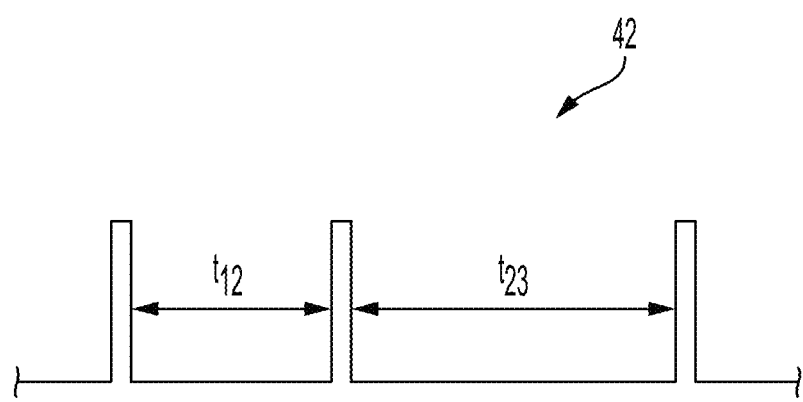
FIG. 3 shows an illustrative diagrammatic graphical representation of probabilities of any given atom to decay in a time interval as may be used in accordance with an aspect of the present invention.

The probability of any given atom to decay in a time interval (t, t+dt) is given by a negative exponential random variable. This is shown graphically at 42 in FIG. 3 where two different consecutive timings ($t_{12}$, $t_{23}$) are shown. The probability may be expressed as follows:

$$p(t)dt = \lambda e^{-\lambda t} dt \quad (2)$$

where, $\lambda$ is the decay constant of the radioactive material. Under the condition that, the amount of decaying atomic nuclei is large enough to be considered as constant during the measurement time and the half-life of the isotope is large enough so that the decay constant $\lambda$ does not change, the time between consecutive decay events is also an exponential random variable.

One significant aspect of the exponential distribution is its memory-less property (also called Markov property). It states that the distribution of the time interval between two successive event points is the same as the distribution of the time interval between an arbitrarily chosen point, and the next event point. The time intervals are independent of previous results, i.e., the decay pulses arrive at independent times and the number of pulses that arrive in a fixed time period follows a Poisson distribution.

The probability of registering k impulses within the interval $\Delta t$ is:

$$p(k) = \frac{(\lambda t)^k}{k!} \cdot e^{-\lambda \Delta t} \quad (3)$$

As noted, QEC produces random pulses when these emitted alpha particles are detected by the sensor. The length of the time interval between two consecutive alpha decay pulses is unpredictable and this fact can be utilized to generate true random numbers.

Another possible source of quantum behavior (of many) would be an atom that releases an electron when stimulated, the photoelectric effect. The photoelectric effect being a, phenomenon in which electrically charged particles are released from or within a material when it absorbs electromagnetic radiation, is also suitable for use in the present invention in certain applications. The effect is often defined as the ejection of electrons from a metal plate when light falls on it. In a broader definition, the radiant energy may be infrared, visible, or ultraviolet light, X-rays, or gamma rays; the material may be a solid, liquid, or gas; and the released particles may be ions (electrically charged atoms or molecules) as well as electrons.

The precise timing of these events is utilized in certain applications of the invention as a source for the generation of randomness that is converted to a numerical representation. The number system into which the random behavior is converted into a number is not significant. A sensor, such as a scintillator or photon detector senses the quantum event and the time is precisely noted.

Figure 4:
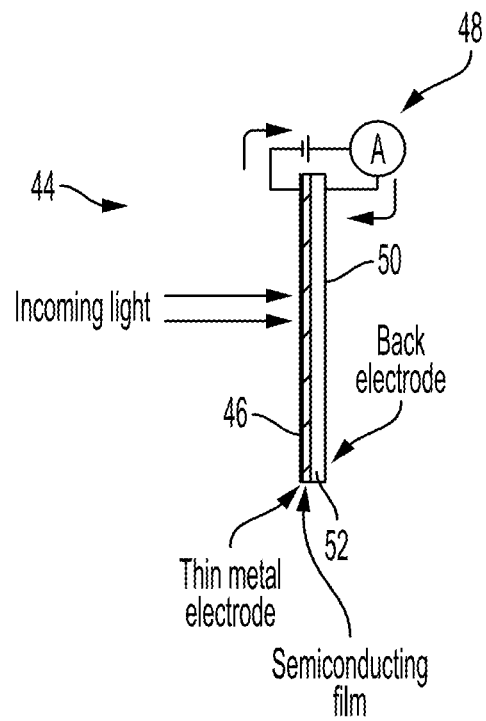
FIG. 4 shows an illustrative diagrammatic view of a photon detector for a quantum system for use in a random number generator in accordance with an aspect of the present invention.
Figure 5:
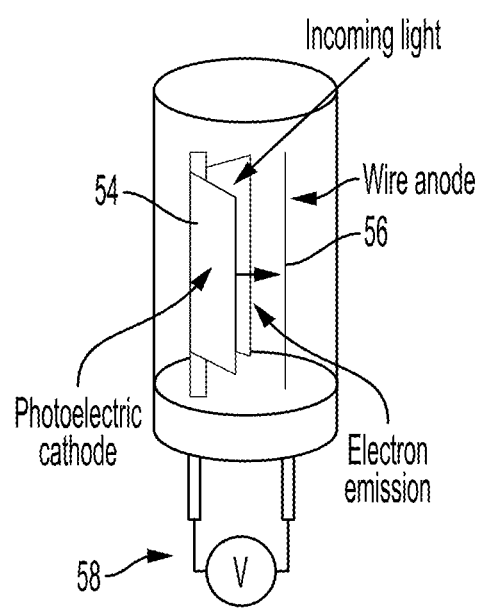
FIG. 5 shows an illustrative diagrammatic view of a photoelectrode cathode that emits electron emission in a quantum system for use in a random number generator in accordance with an aspect of the present invention.

The quantum event detector 14 may be a photon detector that counts photons of light. A photon detector has a surface that absorbs photons and produces some effect (e.g., current, voltage) proportional to the number of photons absorbed. FIG. 4 shows a photon detector for use in certain applications of the present invention, showing incoming light 44 on a thin metal electrode 46. A current is produced and captured by a current capture device 48 as current is generated as light is absorbed by the semiconductor film 52. In particular, the device acts as a photovoltaic cell that consists of the layer of semiconductor (like selenium, Hg—Cd—Te, Cu$_2$O, etc.) sandwiched between two metallic electrodes 52, 46, with the exposed electrode 46 thin enough to be transparent. Photons of light are absorbed by the semiconductor film 52, forming electrons and holes that create a current proportional to the number of photons absorbed. FIG. 5 shows a photoelectrode cathode 54 that emits electron emission toward a wire anode 56 responsive to incoming light with the current being captured at 58. These systems may each be used as a quantum source (12 in FIG. 1) and the current capturing device (e.g., 48, 58) may provide the quantum event detector (14 in FIG. 1) to the computer processing system 16 of FIG. 1.

The times of absorption of photons are then associated with a clock sequence, using for example a time-to-digital converter, which is the fast clock, such as the pico-clock example. Instead of following a traditional or conventional route of using the generated randomness of the radioactive decay (or other such random event) as a seed for generation of a random number by some other process, such as an PRNG algorithm, the system departs completely from the standard convention.

Again. one example might be the use of a pico-clock. The pico-clock measures time in trillionths of a second. Instead of sequentially numbering the trillion ticks per second, this system numbers them according to the digits in any number base system. For example: in a base-10 system the ticks would be numbered 0, 1, 2, 3, 4, 5, 6, 7, 8, 9, 0, 1, 2, 3, 4, 5, 6, 7, 8, 9 . . . etc. The ten numerals in the base-10 system would repeat indefinitely and continuously.

Alternatively, the clock could start generating any number and count up sequentially. By capturing only the last digit of the generated number, the same outcome is achieved. Assume that a quantum event occurs as set out above. That event would be detected and noted at a precise time as set forth above and a number generated. The number generated would have a one-to-one relationship to the entropy or randomness of the initiating quantum event. This is step does not require any intermediary steps to provide a random digit.

Further, the digit generated is one in a potentially endless sequence of such digits. There is no parsing of the sequence required or prohibited. The sequence itself is a continuous stream of random digits (in any number base) that is tied directly to the random quantum event.

The random quality of the quantum event is its lack of predictability and inherent probabilistic nature in time. The nature of the clock in terms of the n ticks/per unit of time has no impact on the random nature of the output, only on the volume of the digits in the sequence. There is no relationship between the indeterminant frequency of the quantum event and the ticks per unit of time of the clock.

Figure 6A:
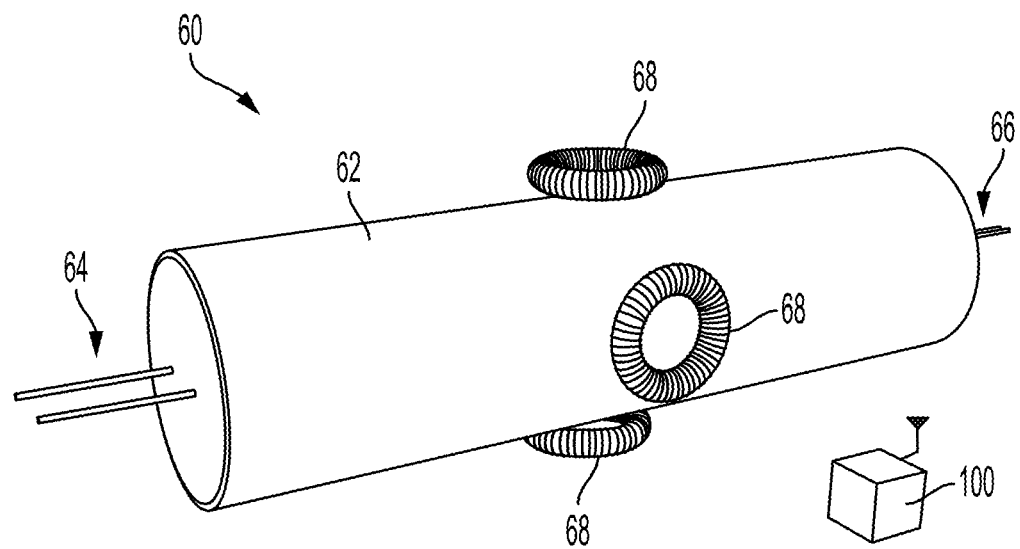
FIGS. 6A and 6B show illustrative diagrammatic views of a cathode ray emitter in a quantum system for use in a random number generator in accordance with an aspect of the present invention, both with the housing (FIG. 6A) and without the housing (FIG. 6B) for clarity.
Figure 6B:
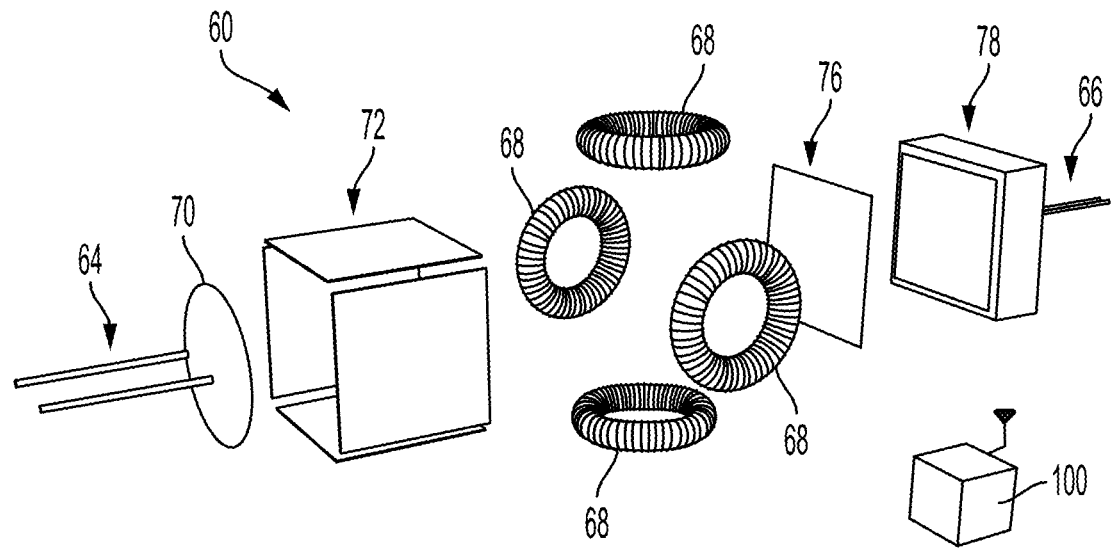

In accordance with further aspects, the quantum random event may be generated using a modified cathode ray emitter. FIG. 6A shows a quantum random event system 60 that includes modified vacuum tube. The vacuum tube includes a housing 62 made from a non-metallic substance, input leads 64, output leads 66, and pairs of vertical and horizontal rotational electromagnets 68. FIG. 6B shows the system 60 without the housing 62, showing the cathode 70, two opposing pairs of plates of the focusing and accelerating anode 72, an electron diffraction grating 76, and a two dimensional matrix sensor array 78. A very high voltage is applied to the input leads 64, causing the cathode 70 to emit electrons. The focusing and accelerating anode 72 has an equally high opposite potential to the cathode, causing the emitted electrons to accelerate and form a beam, and the width of the beam may be adjusted by varying the voltage across the focusing and accelerating anode 72.

The pairs of vertical and horizontal rotational electromagnets 68 are provide after the focusing and accelerating anode 72, and include four toroid electromagnets on the outside of the vacuum tube as shown. The magnets are each provided in the form of a toroid in order that their field orientation may be varied at will and at speed, without any moving parts. For example, a controller 100 may be used to continuously and independently vary currents to any of the electromagnetics 68 with respect to any of amplitude, frequency, phase etc. The vertical and horizontal rotational electromagnets 68 are arranged two opposite one another on a cord at the center of the X-Axis of the vacuum tube and two opposite each other on a cord at the center of the Y-Axis of the vacuum tube. Their field orientation is constantly rotating at high speed in the opposite direction to the magnet opposite (in each pair). This causes a heavy magnetic turbulence in the path of the electrons.

Electrons emitted from the cathode 70 and accelerated via the anode 72, pass through the turbulent magnetic field resulting in the electrons having a random velocity and speed when they hit the diffraction grating 76. This will create a quantum randomness of position and velocity and make the electrons impact truly random. The matrix addressed detector 78, will detect the electrons that impact upon it and produce a random number based upon the position and time in the matrix where the electron impacts. The electrons are small enough and the magnetic field is turbulent enough to create randomness, and the diffraction grating 76 will cause electron interference which is an additional quantum effect. The system may be used as a quantum source (12 in FIG. 1) and the detector 78 may provide the quantum event detector (14 in FIG. 1) to the computer processing system 16 of FIG. 1. This quantum source may produce very large quantities of quantum behavior based random numbers when used with the clock timer/loop and number converter/recorder of aspects of the present invention.

The random number generators disclosed herein may be used in a variety of applications. For example, in one application they may be used as an embedded component in device authentication and security. Random numbers are the foundation on which all of cryptography is built. The difficulty of acquiring sufficient entropy is a common security weakness particularly with the potential emergence of quantum computers. The QRNGs described herein are able to meet and defeat this emerging threat. Particularly when combined with other emerging network security technologies. They are able to produce an output stream with an extremely high entropy at a high speed, and some embodiments may also be constructed cheaply, using off-the-shelf components at low cost.

Random number generators disclosed herein may also be used for example with lottery systems. Lotteries require a continues stream of truly random lottery number of any size or quantity can be easily generated with this methodology. Random number generators disclosed herein may further be used for example in applications requiring cryptographic random key generators. Random numbers of any size, number base can be generated using this methodology. Since these numbers are not rooted in any algorithm, they are not subject to deconstruction using a computer, regardless of the power of the computer. Even the potential of a quantum computer would offer no advantage in decrypting or deciphering the key based on the randomness of this methodology.

Those skilled in the art will appreciate that numerous modifications and variations may be made to the above disclosed embodiments without departing from the spirit and scope of the present invention.

What is claimed is:

1. A random information generator system comprising:
   a quantum event source for generating a quantum event at an unspecified time;
   a quantum event detector for detecting and occurrence of the generated quantum event;
   a looping count circuit providing a looping counting signal including a plurality of counts, the looping counting signal continuously looping through the plurality of counts irrespective of the occurrence of the quantum event;

a converter circuit for associating the occurrence of the quantum event with a contemporaneous count of the plurality of counts of the looping counting signal; and a processing system for providing a random unit of information based on the contemporaneous count.

2. The random information generator system as claimed in claim 1, wherein the processing system includes a memory unit for storing digits.

3. The random information generator system as claimed in claim 2, wherein the random information is a multi-digit random number and the system provides the multi-digit random number using the memory unit.

4. The random information generator system as claimed in claim 1, wherein the system provides a multi-digit random number wherein each digit is obtained based on further contemporaneous counts of the converter circuit of further quantum events.

5. The random information generator system as claimed in claim 1, wherein the random unit of information is a base ten number and the counts include counts ($n_0, n_1, n_2, n_3, n_4, n_5, n_6, n_7, n_8, n_9$).

6. The random information generator system as claimed in claim 1, wherein the random unit of information is a base n number where n is not ten.

7. The random information generator system as claimed in claim 1, wherein the quantum event includes any of a radioactive decay, and a quantum electrodynamic event.

8. The random information generator system as claimed in claim 1, wherein the quantum event is provided by a quantum entropy chip.

9. The random information generator system as claimed in claim 1, wherein the quantum event detector includes any of scintillator and a single photon counting module.

10. The random information generator system as claimed in claim 1, wherein the output of the converter circuit is streamed to the processing system.

11. A method of generating a random unit of information, said method comprising:
generating a quantum event at an unspecified time;
detecting an occurrence of the generated quantum event;
providing a looping counting signal including a plurality of counts, the looping counting signal continuously looping through the plurality of counts irrespective of the occurrence of the quantum event;
associating the occurrence of the quantum event with a contemporaneous count of the plurality of counts of the looping counting signal; and
providing a random unit of information based on the contemporaneous count.

12. The method as claimed in claim 11, wherein the method further includes storing a plurality of contemporaneous counts.

13. The method as claimed in claim 12, wherein the method further includes providing the unit of information as a multi-digit random number.

14. The method as claimed in claim 12, wherein the method further includes providing a set of data that is any of streamed or unparsed.

15. The method as claimed in claim 11, wherein the unit of information is a multi-digit random number and the method further includes providing the multi-digit random number wherein each digit is obtained based on further contemporaneous counts of a converter circuit of associated with further occurrences of quantum events.

16. The method as claimed in claim 11, wherein the random unit of information is a base ten number and the counts include counts ($n_0, n_1, n_2, n_3, n_4, n_5, n_6, n_7, n_8, n_9$).

17. The method as claimed in claim 11, wherein the random unit of information is a base n number where n is not ten.

18. The method as claimed in claim 11, wherein the quantum event includes any of a radioactive decay, and a quantum electrodynamic event.

19. The method as claimed in claim 11, wherein the quantum event is provided by a quantum entropy chip.

20. The method as claimed in claim 11, wherein the quantum event detector includes any of scintillator and a single photon counting module.

21. The method as claimed in claim 11, wherein the method further includes streaming a plurality of contemporaneous counts.

22. The method as claimed in claim 11, wherein the method is used with an embedded component in any of device authentication or security.

23. The method as claimed in claim 11, wherein the method is used in a cryptographic system.

24. A random information generator system comprising:
a quantum event detector for detecting an occurrence of a quantum event;
a processing system including a looping count circuit providing a loop counting signal including a plurality of counts, the looping counting signal continuously looping through the plurality of counts irrespective of the occurrence of the quantum event, a converter circuit for associating the detected occurrence of the quantum event with a contemporaneous count of the plurality of counts, and providing a random unit of information responsive to the occurrence of the detected quantum event as associated with the contemporaneous count of the plurality of counts; and
a subsequent application processing system for receiving the random unit of information with no attendant means to deconstruct the generation of the random unit of information.

25. A secured computer processing system comprising a security key that is generated based at least in part by the random information generator system of claim 1.

26. The secured computer processing system as claimed in claim 25, wherein the security key is further generated responsive to a looping control signal in combination with the occurrence of the detected quantum event.

* * * * *